US008905564B2

(12) United States Patent
Sano et al.

(10) Patent No.: US 8,905,564 B2
(45) Date of Patent: Dec. 9, 2014

(54) ILLUMINATING STRUCTURE OF METER APPARATUS

(71) Applicant: Yazaki Corporation, Tokyo (JP)

(72) Inventors: Masaaki Sano, Shizuoka (JP); Tetsuya Maebashi, Shizuoka (JP); Shigeki Totsuka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 15 days.

(21) Appl. No.: 13/855,693

(22) Filed: Apr. 2, 2013

(65) Prior Publication Data

US 2013/0215594 A1 Aug. 22, 2013

Related U.S. Application Data

(63) Continuation of application No. PCT/JP2011/076974, filed on Nov. 16, 2011.

(30) Foreign Application Priority Data

Nov. 16, 2010 (JP) ................................ 2010-256186
Jun. 7, 2011 (JP) ................................ 2011-127417

(51) Int. Cl.
*G01D 13/22* (2006.01)
*F21V 33/00* (2006.01)
*G01D 11/28* (2006.01)

(52) U.S. Cl.
CPC ................ *F21V 33/00* (2013.01); *G01D 11/28* (2013.01)
USPC ................... 362/23.18; 362/23.19; 362/23.16

(58) Field of Classification Search
CPC ........................................................ F21V 33/00
See application file for complete search history.

(56) References Cited

U.S. PATENT DOCUMENTS 4,625,262 A 11/1986 Sakakibara et al.
4,860,170 A 8/1989 Sakakibara et al.
5,335,148 A * 8/1994 Tominaga ........................ 362/26
5,706,757 A 1/1998 Hashimoto et al.
7,575,331 B2 * 8/2009 Birman et al. .................. 362/27
8,651,679 B2 * 2/2014 Shimane et al. ........... 362/23.21
8,727,549 B2 * 5/2014 Farell ......................... 362/23.07
2002/0002941 A1 1/2002 Nakane
2009/0173271 A1 7/2009 Sigg et al.
2014/0078713 A1 * 3/2014 Maebashi et al. .......... 362/23.21

FOREIGN PATENT DOCUMENTS

DE 3425029 A1 1/1985
EP 1 471 336 A1 10/2004
JP 3291732 B2 6/2002
JP 2009-5378744 A 10/2009

OTHER PUBLICATIONS

International Search Report for PCT/JP2011/076974 and Form PCT/ISA/237 dated Apr. 3, 2012.

* cited by examiner

*Primary Examiner* — Anabel Ton
(74) *Attorney, Agent, or Firm* — Kenealy Vaidya LLP

(57) ABSTRACT

An illuminating structure of a meter apparatus illuminates an indicator 7 and a text panel 9 while the indicator 7 rotates to indicate various kinds of information, wherein the rotary shaft 5 has lateral light separating unit 10, formed with a dented portion toward a light source 3, at the front end surface of the front end portion thereof, and the lateral light separating unit 10 partially separates the illuminating light incident to the indicator 7 toward the text panel 9.

9 Claims, 15 Drawing Sheets

ILLUMINATING STRUCTURE OF METER APPARATUS

CROSS REFERENCE TO RELATED APPLICATION

This application is a continuation of PCT application No. PCT/JP2011/076974, which was filed on Nov. 16, 2011 based on Japanese Patent Application (No. 2010-256186) filed on Nov. 16, 2010 and Japanese Patent Application (No. 2011-127417) filed on Jun. 7, 2011, the contents of which are incorporated herein by reference. Also, all the references cited herein are incorporated as a whole.

BACKGROUND OF THE INVENTION

1. Technical Field

The present invention relates to a meter apparatus loaded on a vehicle or the like.

2. Background Art

In this kind of meter apparatus loaded on a vehicle or the like, a dedicated light source at a rear side illuminates a text panel in which letters, numbers and markings are installed, or illuminates an indicator which indicates a letter, a number or the like in the text panel (for example, see Japanese Patent No. 3291732).

In other words, the meter apparatus is an indicative instrument useful as a speedometer of a vehicle, and as shown in FIG. 16, a motor case 102 is mounted between a print substrate 101 and a text panel 107, and a rotary shaft 106 made of a hollow shaft is supported to shaft support portions 104 and 105 of the motor case 102. An indicator shaft 110 integrated with an indicator 109 is mounted to the rotary shaft 106, and the indicator 109 is rotated by means of the rotary shaft 106 by a motor, not shown, provided to the motor case 102. In addition, an LED 111 serving as a light source is disposed in the rotary shaft 106. The LED 111 is fixed to the print substrate 101 and configured to emit illuminating light toward a light receiving surface 109A of the indicator 109, and the illuminating light incident to the indicator 109 is reflected on a reflective surface 109B and then illuminates the indicator 109. In addition, in the meter apparatus, in order to illuminate the text panel 107, though not shown in the figures, a plurality of dedicated light sources are separately disposed at a lower side of the text panel 107.

In addition, as such a meter apparatus, it is known in the art to enhance the light emitting efficiency of the indicator (for example, see PCT Japanese Translation Patent Publication No. 2009-537844).

In other words, the meter apparatus includes, as shown in FIG. 17, a motor case 201, an indicator 202 guided by a protrusive portion 201A used as a bearing provided to a main body of the motor case 201, a light source 205 composed of an LED and disposed right below a hollow shaft 204 while being away by a distance H from the lower end portion 203A of the indicator shaft 203 provided to a base portion of the indicator 202, and a print substrate 206 to which the light source 205 is mounted.

In the meter apparatus, the indicator shaft 203 of the indicator 202 has a light collecting surface having a convex surface at the lower end portion 203A in order to optimally collect the illuminating light emitted from the light source 205 in a better way. In addition, in the indicator 202, the indicator shaft 203 has a cylindrical shape, and the lower end portion 203A preferably has a hemispherical or convex shape, but also may have other shapes. Such specific shapes allow the emission of light by the light source 205 composed of LED to be maintained focused in parallel to the axis of the indicator shaft 203. In addition, even in the meter apparatus, similar to the above meter apparatus, a plurality of dedicated light sources, not shown, are disposed below a text panel, not shown, to illuminate the text panel.

In such a meter apparatus, since an optical axis of the light source is set on the indicator shaft, the light from the light source may be effectively transferred to the indicator to illuminate the indicator, and in particular, regardless of in which direction the indicator is oriented, there is no particular problem since light unevenness is restrained.

However, in such a meter apparatus, since the light source is installed at the center portion of the text panel which is the center of rotation of the indicator, it is physically impossible to newly install a light source for illuminating the text panel, for example, right below the center of the text panel, separately from the above light source, and to transfer the light from the light source to the text panel in order to illuminate the text panel. From this point of view, in order to illuminate the text panel as uniformly as possible, as described above, separately from the light source for illuminating the indicator, a plurality of dedicated light sources should be installed at suitable intervals below the text panel, which increases costs.

SUMMARY OF INVENTION

The present invention is designed in consideration of the above, and an object of the present invention is to provide an illuminating structure of a meter apparatus which may illuminate an indicator and a text panel simultaneously by using one light source.

In order to accomplish the object, the illuminating structure of a meter apparatus according to the present invention has the following features (1) to (9).

(1) An illuminating structure of a meter apparatus, which includes: a text panel; a rotary shaft rotating by a rotating force transferred from a motor and installed to a rear side of the text panel; an indicator having a hole through which a front end portion of the rotary shaft is inserted, the indicator rotating along a surface of the text panel having an indicator shaft mounted to the rotary shaft as the front end portion of the rotary shaft is inserted through the hole; and a light source for emitting illuminating light to a base end portion of the rotary shaft, wherein the indicator rotates to indicate various kinds of information, wherein the rotary shaft has lateral light separating unit, formed by a dented portion toward the light source, at a front end surface of the front end portion thereof, and wherein the lateral light separating unit partially separates the illuminating light incident on the indicator toward the text panel.

(2) The illuminating structure of a meter apparatus according to the feature (1), wherein the lateral light separating unit provided to the front end surface of the front end portion of the rotary shaft is configured as a reflective surface having a hole with a substantially conical shape.

(3) The illuminating structure of a meter apparatus according to the feature (1), wherein the lateral light separating unit provided to the front end surface of the front end portion of the rotary shaft is configured as a reflective surface having a hole with a regular polygonal pyramid shape, and wherein the outer surface of the front end portion of the rotary shaft is configured as a surface with a regular polygonal pillar shape with the same number of corners corresponding to the reflective surface provided to the hole of the front end surface.

(4) The illuminating structure of a meter apparatus according to the feature (3), wherein each reflective surface configuring each polygonal pyramid surface has a curved shape dented with an arc sectional shape.

(5) An illuminating structure of a meter apparatus, which includes: a text panel; an indicator having an indicator shaft and rotating along a surface of the text panel; a rotary shaft having a hole through which a front end portion of the indicator shaft is inserted, the indicator shaft being mounted to the rotary shaft as the front end portion of the rotary shaft is inserted through the hole, the rotary shaft rotating by a rotating force transferred from a motor and provided to a rear surface of the text panel; and a light source for emitting illuminating light to a base end portion of the rotary shaft, wherein the indicator rotates to indicate various kinds of information, wherein the indicator shaft has lateral light separating unit formed to protrude on the front end portion thereof toward the light source, and wherein the lateral light separating unit partially separates the illuminating light incident on the indicator toward the text panel.

(6) The illuminating structure of a meter apparatus according to the feature (5), wherein the lateral light separating unit provided to the front end surface of the front end portion of the indicator shaft is configured as a reflective surface having a convex portion with a protrusive conical shape.

(7) The illuminating structure of a meter apparatus according to the feature (5), wherein the lateral light separating unit provided to the front end surface of the front end portion of the indicator shaft is configured as a reflective surface having a convex portion with a protrusive regular polygonal pyramid shape, and the outer surface of the front end portion of the indicator shaft is configured as a surface with a regular polygonal pillar shape having the same number of corners corresponding to the reflective surface, and wherein the hole of the front end portion of the rotary shaft in which the outer surface of the front end portion of the indicator shaft is fitted in an inserted state is configured as a surface with a polygonal pillar shape with the same number of corners corresponding to the outer surface with a polygonal pillar shape provided to the front end portion of the indicator shaft.

(8) The illuminating structure of a meter apparatus according to the feature (7), wherein each reflective surface with the polygonal pyramid shape has a protrusive curved surface shape where the reflective surface billows with an arc sectional shape.

(9) The illuminating structure of a meter apparatus according to any one of the features (1) to (8), further comprising a case having a reflecting unit formed at an inner surface of the mounted text panel which is opposite to the rear surface of the text panel, wherein the illuminating light separated by the lateral light separating unit is reflected on the reflecting unit and then is incident to the text panel.

According to the illuminating structure of the meter apparatus of the feature (1), since the light from the light source may be partially separated by the lateral light separating unit provided to the front end of the rotary shaft, the indicator and the text panel may be illuminated simultaneously using one light source.

According to the illuminating structure of the meter apparatus of the feature (2), since the lateral light separating unit may be configured with a reflective surface which may be easily produced, it is possible to reduce costs.

According to the illuminating structure of the meter apparatus of the feature (3), since substantially uniform brightness distribution may be realized, the generation of highlights may be restrained. As a result, it is possible to avoid blinking or rotation of the blinking which is inconvenient to the eyes of an observer when the rotary shaft is rotating.

According to the illuminating structure of the meter apparatus of the feature (4), since the illuminating light emitted from the outer circumference of the rotary shaft forms the reflected light with substantially uniform brightness distribution, it is possible to substantially entirely remove the highlight regions. As a result, it is possible to prevent the brightness from locally increasing, and even though the rotary shaft is rotating, it is possible to avoid blinking or rotation of the blinking which is inconvenient to the eyes of an observer.

According to the illuminating structure of the meter apparatus of the feature (5), since the light from the light source may be partially separated by the lateral light separating unit provided to the front end of the indicator shaft, the indicator and the text panel may be illuminated simultaneously using one light source.

According to the illuminating structure of the meter apparatus of the feature (6), since the lateral light separating unit may be configured with a reflective surface which may be easily produced, it is possible to reduce costs.

According to the illuminating structure of the meter apparatus of the feature (7), since substantially uniform brightness distribution may be realized, the generation of highlights may be restrained. As a result, it is possible to avoid blinking or rotation of the blinking which is inconvenient to the eyes of an observer when the rotary shaft is rotating.

According to the illuminating structure of the meter apparatus of the feature (8), since the illuminating light emitted from the outer circumference of the rotary shaft forms the reflected light with substantially uniform brightness distribution, it is possible to substantially entirely remove the highlight regions. As a result, it is possible to prevent the brightness from locally increasing, and even though the rotary shaft is rotating, it is possible to avoid blinking or rotation of the blinking which is inconvenient to the eyes of an observer.

According to the illuminating structure of the meter apparatus of the feature (9), the text panel may be illuminated more uniformly.

According to the illuminating structure of the meter apparatus according to the present invention, since the optical path of the illuminating light is partially separated toward the text panel by the lateral light separating unit, the text panel is illuminated by using the partial light incident to the indicator, and therefore the indicator and the text panel can be illuminated simultaneously by using one light source, which reduces costs.

Heretofore, the present invention has been described in brief. Further, the present invention described below will be understood in more detail by reading the following embodiments of the present invention with reference to the accompanying drawings.

BRIEF DESCRIPTION OF THE DRAWINGS

FIG. 5(A) to FIG. 5(C) are respectively optical path diagrams showing the cases where the tilt angle of the upper end surface of the rotary shaft is different.

FIG. 6(A) to FIG. 6(D) are diagrams respectively illustrating a kind of lateral light separating unit.

FIG. 14(A) shows an operation of the meter apparatus and FIG. 14(B) shows its modified example.

DESCRIPTION OF THE PREFERRED EMBODIMENTS

Hereinafter, embodiments of the present invention will be described in detail with reference to the accompanying drawings. In addition, though FIGS. 1, 2 and 14 are cross-sectional views, some regions in those figures are not hatched so that optical paths may be easily recognized.

First Embodiment

Figure 1:
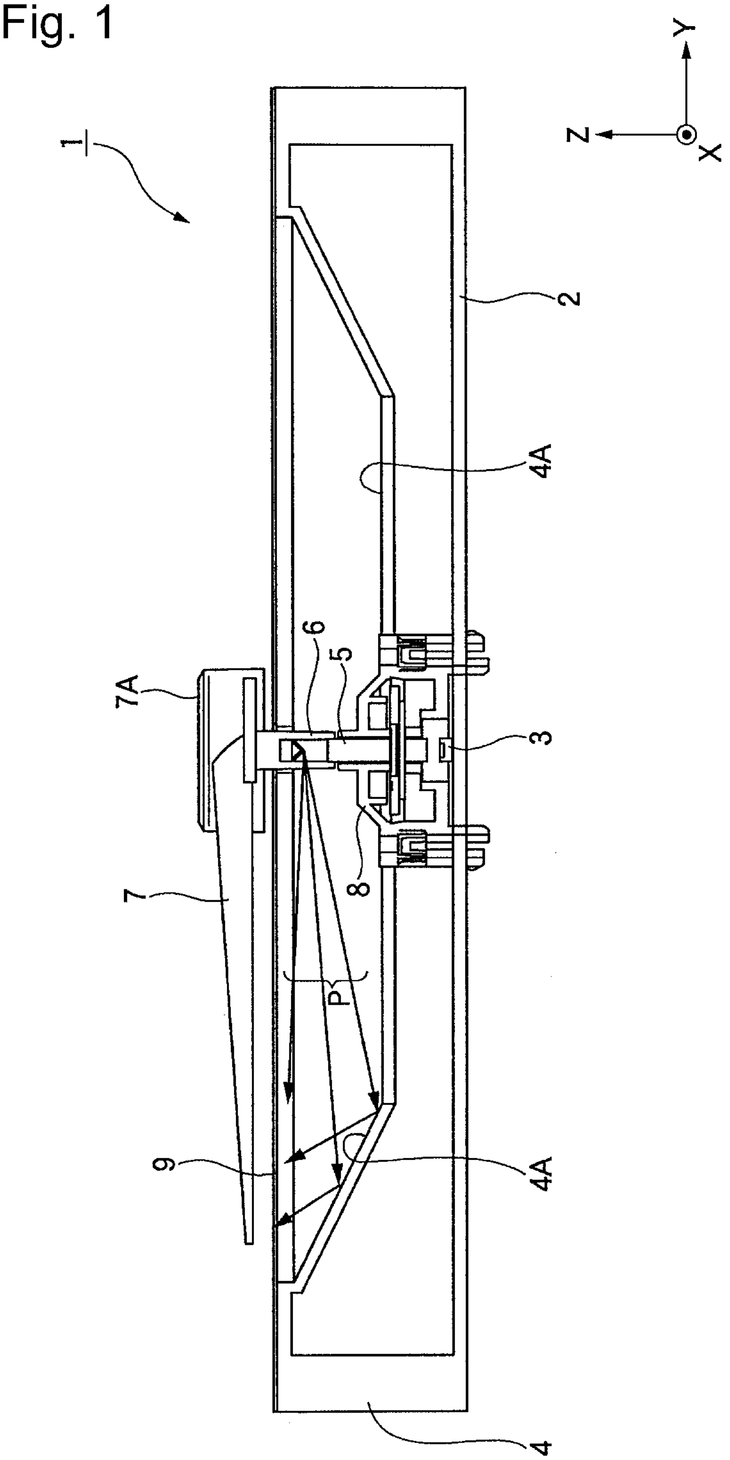
FIG. 1 is a cross-sectional view showing a meter apparatus to which an illuminating structure of a meter apparatus according to a first embodiment of the present invention is applied.
Figure 2:
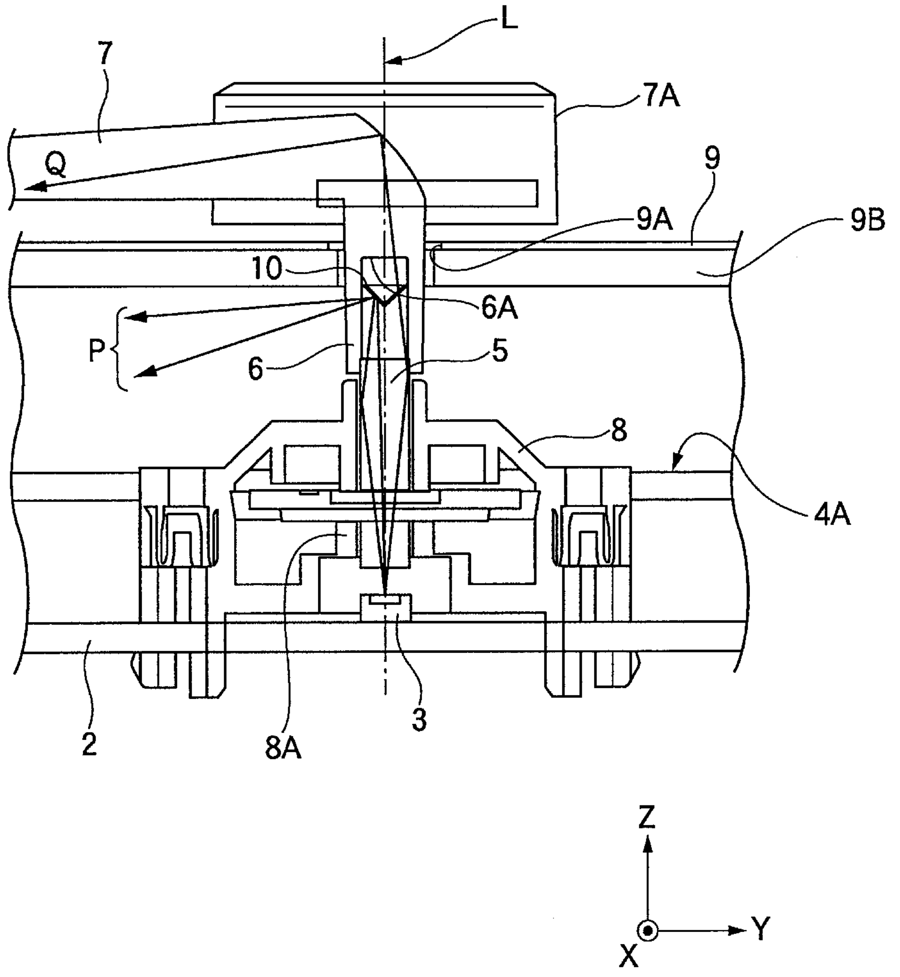
FIG. 2 is a diagram showing an optical path in an essential portion of the meter apparatus to which the illuminating structure of a meter apparatus according to the first embodiment of the present invention is applied.
Figure 3:
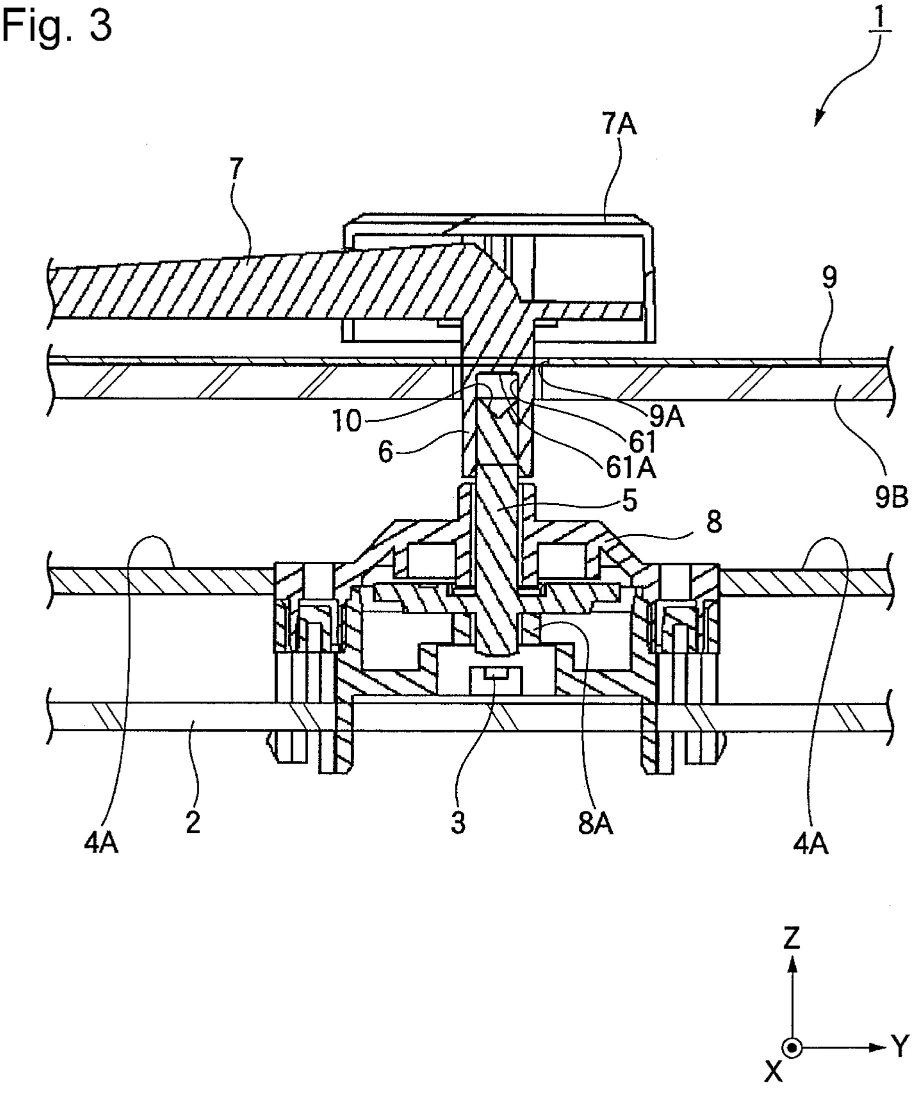
FIG. 3 is a cross-sectional view showing an essential portion of the meter apparatus to which the illuminating structure of a meter apparatus according to the first embodiment of the present invention is applied.

FIGS. 1 to 3 show a meter apparatus 1 to which the illuminating structure of a meter apparatus according to the present invention is applied.

The meter apparatus 1 includes a light source 3 mounted on a substrate 2, a case 4 mounted to a predetermined location above the substrate 2 having a region where the light source 3 is loaded, a rotary shaft 5 rotating by a driving force transmitted from a motor, not shown, included in a motor case 8, an indicator 7 integrated with an indicator shaft 6 mounted to the front end portion of the rotary shaft 5, a text panel 9 installed to the upper portion of the case 4 to display necessary information such as numbers, letters, symbols and the like about a vehicle or surrounding environments by the indicator 7, and a lateral light separating unit 10 formed at the upper end surface of the front end portion of the rotary shaft 5. In addition, a reference symbol 7A in the figures designates a cap covering the base portion of the indicator 7.

The meter apparatus 1 of this embodiment configures a part of a combination meter, and its peripheries are covered by a facing panel, not shown. In addition, various display windows are perforated in the facing panel in order to install various kinds of meters such as the meter apparatus 1 therein, and the facing panel is integrated with a combination meter case which configures side surfaces and a rear surface.

In addition, in this embodiment, since the meter apparatus 1 configures a speedometer, the indicator 7 is rotated by only a predetermined angle based on a sensor signal corresponding to a speed detected by a sensor, not shown, to indicate a specific marking formed in the text panel 9.

The light source 3 of this embodiment emits illuminating light toward the lower end portion of the rotary shaft 5 and is composed of, for example, an LED (Light Emitting Diode) which emits a visible light of a predetermined wavelength (λ). The emitted light (hereinafter, referred to as illuminating light) of the light source 3 has a uniform light emitting feature without depending on the direction of a phase angle. In other words, the light source 3 of this embodiment has an intensity distribution feature where substantially uniform intensity is emitted to the rotary shaft 5 over the entire circumference in the direction of a horizontal plane (X-Y plane). In addition, the light source 3 of this embodiment is preferably a small point light source with small power consumption, though not particularly limited to an LED.

A reflecting unit 4A is provided to the case 4 at an inner surface of the text panel 9 which is opposite to the rear surface (the lower surface) mounted to the case 4, so that the reflected light P separated by a lateral light separating unit 10 installed to the front end portion of the rotary shaft 5, described later, may be efficiently reflected to the text panel 9. The reflecting unit 4A may be configured as a reflective film to which metal such as Al (aluminum) is deposited, or a dielectric multi-layered film having a great peak reflection feature with respect to an inherent wavelength (λ) of a monochrome illuminating light emitted from LED which is the light source 3.

The rotary shaft 5 rotates by a rotating force transmitted from the motor, as described above, and has a substantially cylindrical shape made of light transmitting material. The rotary shaft 5 is fitted to the indicator shaft 6 in a state in which its upper end side which is the front end portion is inserted into a hole 61 of the indicator shaft 6. The indicator shaft 6 is fixed to the rotary shaft 5 as the rotary shaft 5 is fitted into the hole 61 of the indicator shaft 6. In addition, the rotary shaft 5 is installed to a rear surface side of the text panel 9. In addition, the lower end portion of the rotary shaft 5 is axially supported rotatably to a bearing 8A provided to the motor case 8, and the light source 3 is exactly opposite to its lower end surface.

As described above, as shown in FIG. 3, the lower end surface of the rotary shaft 5 is provided to be located right above the light source 3, and, if illuminating light is incident from the light source 3, the illuminating light is guided in the rotary shaft 5 and propagates to the upper end portion thereof. For this reason, in the rotary shaft 5, at the interface portion between the externality (the atmosphere) and the outer circumference thereof, it is configured so that the illuminating light is almost totally reflected to progress to the upper end portion. In this case, the total reflection phenomenon at the interface between the outer circumference of the rotary shaft 5 and the externality is efficiently generated. In other words, the illuminating light is incident in a direction in which an incidence angle seems to always exceed an inherent threshold angle at the outer circumference. For this reason, in this embodiment, the lower end surface is formed with an arc sectional shape from the center portion (an axial line L; see FIG. 2) of the rotary shaft 5 to the circumference (see FIG. 3).

In addition, as shown in FIG. 3, the rotary shaft 5 has the lateral light separating unit 10, formed by a dented portion toward the light source 3, at the upper end surface of the front end portion. The lateral light separating unit 10 separates at least a part of the illuminating light, guided through the inside of the rotary shaft 5 from the light source 3, toward the text panel 9. In this embodiment, the upper end surface has a dented substantially conical sectional shape, as shown in FIG. 4(A).

The lateral light separating unit 10 uses the phenomenon (Fresnel reflection) that the illuminating light guided from the light source 3 by the rotary shaft 5 is partially reflected at an interface with a medium (here, the air) having a different refractive index, at the upper end surface of the rotary shaft 5. In other words, by separating the reflected light at the upper end surface of the rotary shaft 5 toward the text panel 9, the text panel 9 is illuminated. In addition, the other illuminating light, in other words, the illuminating light reflected and passing through the upper end surface of the rotary shaft 5, is then incident to the indicator shaft 6, and after that the indicator 7 is illuminated by the illuminating light.

The upper end surface of the rotary shaft 5 which is the lateral light separating unit 10 of this embodiment has a dented substantially conical shape to be inclined with respect to a horizontal plane at a predetermined tilt angle α as described above, but as is well-known in the art, according to Snell's law, the direction of the reflected light P progressing after the illuminating light guided through the inside of the rotary shaft 5 from the light source 3 is reflected on the interface depends on the refractive index and the incidence angle θ of the rotary shaft 5. Meanwhile, in the upper end surface of the rotary shaft 5, since an incident angle θ to a normal N may be changed by changing the tilt angle α, in regard to the direction in which the reflected light P progresses, the optical path of the reflected light P may be adjusted by changing the tilt angle α.

Figures 4A, 4B, 4C:
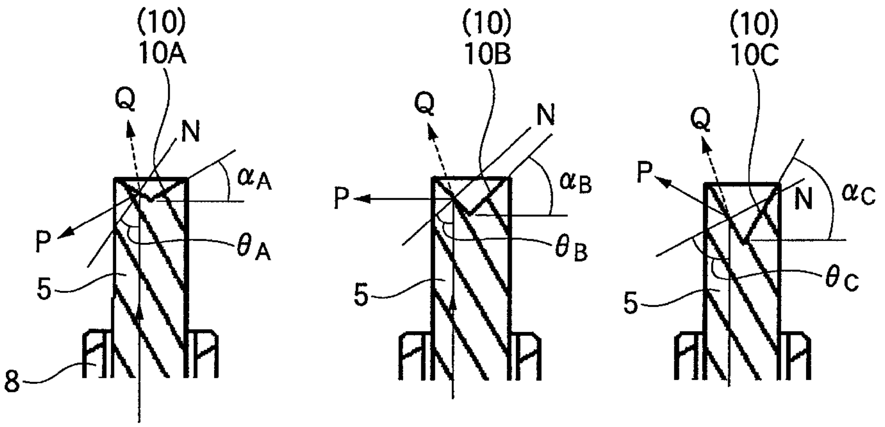
FIG. 4(A) to FIG. 4(C) are diagrams showing a tilt angle of the upper end surface of a rotary shaft of the meter apparatus of FIG. 1 and optical paths of the illuminating light thereof, and FIG. 4(A) to FIG. 4(C) respectively illustrate the cases where the tilt angle of the upper end surface of the rotary shaft is different.
Figures 5A, 5B, 5C:
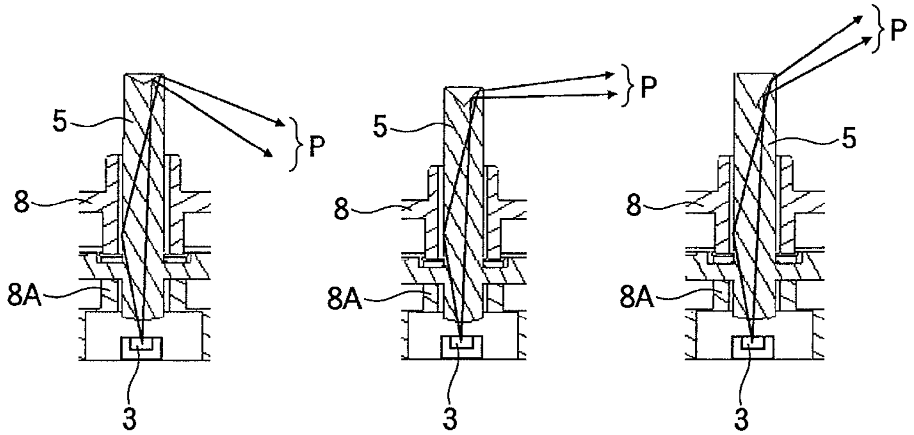
FIG. 5(A) to FIG. 5(C) are optical path diagrams showing a tilt angle of the upper end surface of the rotary shaft of a meter apparatus of FIG. 1 and an optical path along which the illuminating light from the light source progresses.

In addition, in this embodiment, by setting the tilt angle α A of the upper end surface of the rotary shaft 5 to be about 30 degrees as shown in FIG. 4(A), for example, the progressing direction of the reflected light P is biased to an inclined downward direction as shown in FIG. 5(A). In addition, on the optical path along which the reflected light P progresses, the reflecting unit 4A is provided on the inner surface of the case 4 as described above, and by reflecting the illuminating light again toward the text panel 9, the text panel 9 may be illuminated. However, for simplified description and easier understanding, as shown in FIG. 4(A) to FIG. 4(C), the optical path of the illuminating light from the light source 3 through the inside of the rotary shaft 5 to the upper end surface is illustrated to be just in parallel to the horizontal (z) direction, but the optical path is not limited to the direction.

In addition to the above embodiment, by setting the tilt angle α B of the upper end surface of the rotary shaft 5 to be about 45 degrees as shown in FIG. 4(B), for example, the progressing direction of the reflected light may be biased substantially to the horizontal direction as shown in FIG. 5(B). In addition, in this case, since the text panel 9 is provided to substantially coincide with the optical path along which the reflected light progresses, the entire text panel 9 may be more effectively illuminated by making the text panel 9 with material having a good light guiding property or by disposing a light guiding member 9B to the lower surface of the text panel as shown in FIGS. 2 and 3.

In addition, by setting the tilt angle α C of the upper end surface of the rotary shaft 5 to be about 60 degrees as shown in FIG. 4(C), the progressing direction of the reflected light P may be biased in an inclined upward direction to the indicator shaft 6 as shown in FIG. 5(C). In addition, in this case, if the intensity of the partial light toward the text panel 9 is decreasing greatly, the illuminating light may be minutely scattered on the upper surface of the text panel 9 and the processing surface may be coated with a reflective film so that the entire text panel 9 may be effectively illuminated. In addition, in this case, as the reflective film, a transparent reflective film such as a dielectric multi-layered film, not a metal deposition film, is preferably formed so as to ensure recognition from the outside, which is the upper portion of the text panel 9.

In addition, regarding the tilt angle α of the upper end surface of the rotary shaft 5, in FIG. 4(A) to FIG. 4(C), in order to generate a reflective light Q from the upper end surface of the rotary shaft 5 together with the reflected light P, namely, the illuminating light progressing through the inside of the rotary shaft 5 is required not to cause the total reflection at the interface with the externality and the upper end surface. For this reason, regarding the tilt angle α, the tilt angle α needs to be controlled so as to satisfy a condition that the incident angle θ of the illuminating light is less than an inherent threshold angle (θ0) for the wavelength λ of the illuminating light emitted from the light source 3.

Figure 6A:
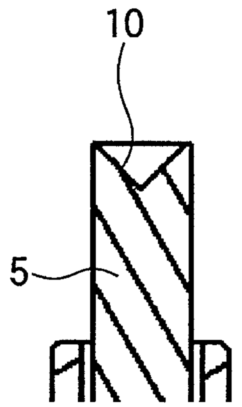
FIG. 6(A) to FIG. 6(D) are diagrams showing detailed aspects of lateral light separating unit provided to the upper end of the rotary shaft of the meter apparatus to which the illuminating structure of a meter apparatus according to the first embodiment of the present invention is applied.
Figure 6B:
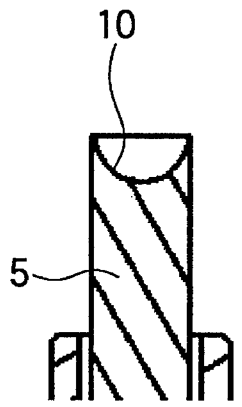
Figure 6C:
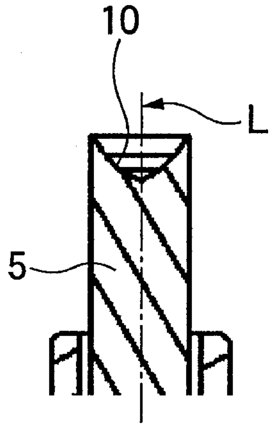
Figure 6D:
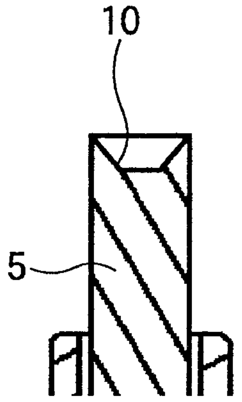

In addition, in this embodiment, though the upper end of the rotary shaft 5 which is the lateral light separating unit 10, is configured with a substantially valley shape, namely with a dented substantially triangular sectional shape as shown in FIG. 6(A), it may also be configured with, for example, a dented substantially U-shaped sectional shape as shown in FIG. 6(B), with a dented portion where a line seems to continuously extend along the axial line L of the rotary shaft 5 in the cross-sectional view of FIG. 6(C), or with a dented substantially trapezoidal sectional shape as shown in FIG. 6(D).

The indicator shaft 6 is made of material with an excellent light transmission property, is installed to integrally extend downwards from the base portion of the indicator 7, and has a hole 61 formed in the lower end surface with a circumferentially perforated hole 61 (see FIG. 3), so that the front end portion of the rotary shaft 5 is inserted through and fitted in the hole 61. As described above, though the indicator shaft 6 is integrally assembled with the rotary shaft 5 which rotates by the driving force of the motor, in order to rotatably insert the indicator shaft 6 into the text panel 9, the indicator shaft 6 is installed through the hole 9A (see FIGS. 2 and 3) of the text panel 9. A ceiling surface 61A located at the bottom of the hole 61 perforated in the lower end of the indicator shaft 6 has a flat shape parallel to the horizontal (X-Y) direction in order to prevent the illuminating light coming through the rotary shaft 5 from leaking out as much as possible.

The indicator 7 rotates along the surface of the text panel 9 by means of the indicator shaft 6 to indicate a number or marking provided to the text panel 9, and the indicator 7 is integrally formed with the indicator shaft 6 by material with an excellent light transmission property, as described above.

The motor case 8 includes a motor, not shown, an intermediate gear, an output gear, a rotary shaft 5, and the like therein. The motor is used for rotating the indicator 7, and the indicator 7 securely rotates along the surface of the text panel 9 and accurately indicates various kinds of necessary information by reduction using the intermediate gear and the output gear and rotating the rotary shaft 5.

The text panel 9 is made of suitable material having a light guiding function in itself, but as described above, in the upper end surface of the rotary shaft 5 which is the lateral light separating unit 10, particularly in the case where the tilt angle α is set to be about 45 degrees as shown in FIG. 4(B), it is preferable to make the text panel 9 with material particularly having an excellent light guiding property or to dispose the light guiding member 9B to the lower surface of the text panel. By doing so, it is possible to effectively illuminate the entire text panel 9.

In addition, in the upper end surface of the rotary shaft 5 which is the lateral light separating unit 10, as described above, particularly in the case where the tilt angle α is set to be about 60 degrees as shown in FIG. 4(C), it is preferred to perform minute scattering at the upper surface of the text panel 9 and to coat the processing surface with a reflective film or the like. By doing so, it is possible to effectively illuminate the entire text panel 9.

Next, an operation of the meter apparatus 1 according to this embodiment will be described with reference to the drawings. In addition, though the meter apparatus 1 is described here based on a speedometer as an example among various kinds of meters, the meter apparatus is not particularly limited thereto but a different kind of analog meter apparatus or the like may be applied similarly. In addition, regarding the illuminating light in FIG. 4(A) to FIG. 4(C) and FIG. 5(A) to FIG. 5(C), for easier understanding of the disclosure, the optical path is particularly described to be in the direction where refraction is considered only for the upper end surface of the rotary shaft 5, and the optical path at the side surface of the rotary shaft 5 is not described to be in the direction where refraction is considered but to be simply linear for convenience.

If a vehicle on which the meter apparatus 1 is loaded starts moving, the motor provided in the motor case 8 of the meter apparatus 1 initiates the rotation based on a sensor signal corresponding to a present speed detected by a sensor, not shown, so that the indicator 7 rotates by only a predetermined angle to indicate a specific marking or number formed on the text panel 9.

In other words, as shown in FIG. 3, the rotary shaft 5 rotates by a predetermined angular speed suitable for the speed by the driving force of the motor, not shown. By doing so, by means of the indicator shaft 6 assembled to the upper end portion of the rotary shaft 5, the indicator 7 integrated with the indicator shaft 6 rotates by only a predetermined angle to indicate a specific marking or number on the text panel 9 to the front of the indicator 7. By doing so, the present speed may be analog-displayed to a driver or the like.

In the meter apparatus 1 displaying a speed as described above, the illuminating light emitted from the light source 3 simultaneously repeats the propagation phenomenon where the illuminating light progresses upwards while causing total reflection at the interface between the externality and the outer circumference in the rotary shaft 5. In addition, if the illuminating light reaches the upper end portion of the rotary shaft 5, the illuminating light partially causes Fresnel reflection as shown in FIG. 5(A) on the upper end surface which is the lateral light separating unit 10 and progresses downwards. In addition, the reflected light P is reflected again toward the text panel 9 by the reflecting unit 4A provided at the inner surface of the case 4 on the optical path so that the text panel 9 may be illuminated.

Meanwhile, the other illuminating light becomes refracted light Q refracted at the upper end surface of the rotary shaft 5 as shown in FIG. 4(A), so that the other illuminating light is refracted there to emit from the rotary shaft, then progresses through the hole 61 of the indicator shaft 6 shown in FIG. 3, and finally is incident on the indicator shaft 6 and progresses to the indicator 7. By doing so, among the illuminating light emitted from the light source 3 and reaching the upper end portion of the rotary shaft 5, the refracted light Q not reflected but refracted on the upper end surface to transmit upwards mostly illuminate the indicator 7.

In addition, the propagation of the illuminating light in the rotary shaft 5 and the light separation at the upper end of the rotary shaft 5 are performed in entirely the same way as in a stop state, even though the rotary shaft 5 is rotating. Therefore, even though the rotary shaft 5 is rotating, the indicator 7 and the text panel 9 may be illuminated simultaneously by the illuminating light of the same light source 3.

As described above, according to this embodiment, by means of the lateral light separating unit 10 provided to the front end portion of the upper end surface of the rotary shaft 5, by partially separating the optical path of the illuminating light incident to the indicator 7 toward the text panel 9, the reflected light P which is a part of the illuminating light to be incident to the indicator 7 may be used for illuminating the text panel 9. Therefore, the indicator 7 and the text panel 9 may be illuminated simultaneously by using one light source 3, without providing a plurality of light sources right below the text panel 9.

In addition, in this embodiment, the upper end portion of the rotary shaft 5 is inserted into the hole 6 of the indicator shaft 6. Therefore, the partial illuminating light which causes Fresnel reflection by the lateral light separating unit 10 provided to the upper end surface of the rotary shaft 5 and progresses to the outside may be partially brought into the indicator shaft 6 not only from the ceiling surface 61A of the hole 61 of the indicator shaft 6 surrounding the entire circumference of the rotary shaft 5 but also from the inner circumference which is a side of the hole 61. Therefore, the illuminating light which is scheduled to be consumed by the separating work of the lateral light separating unit 10 to illuminate the text panel 9 may be partially brought again into the indicator shaft 6. As a result, it is possible to prevent the light emitting efficiency at the indicator 7 from being greatly deteriorated. By doing so, even though the indicator shaft 6 does not have a large diameter, the light intensity at the indicator 7 may be sufficiently ensured, and therefore the meter apparatus 1 having an illuminating structure with an excellent lighting efficiency may be designed in a small size.

Second Embodiment

Next, the second embodiment of the present invention will be described in detail with reference to the drawings. In addition, in this embodiment, the same component as in the first embodiment is represented by the same reference symbol to avoid duplicated description.

Figure 7B:
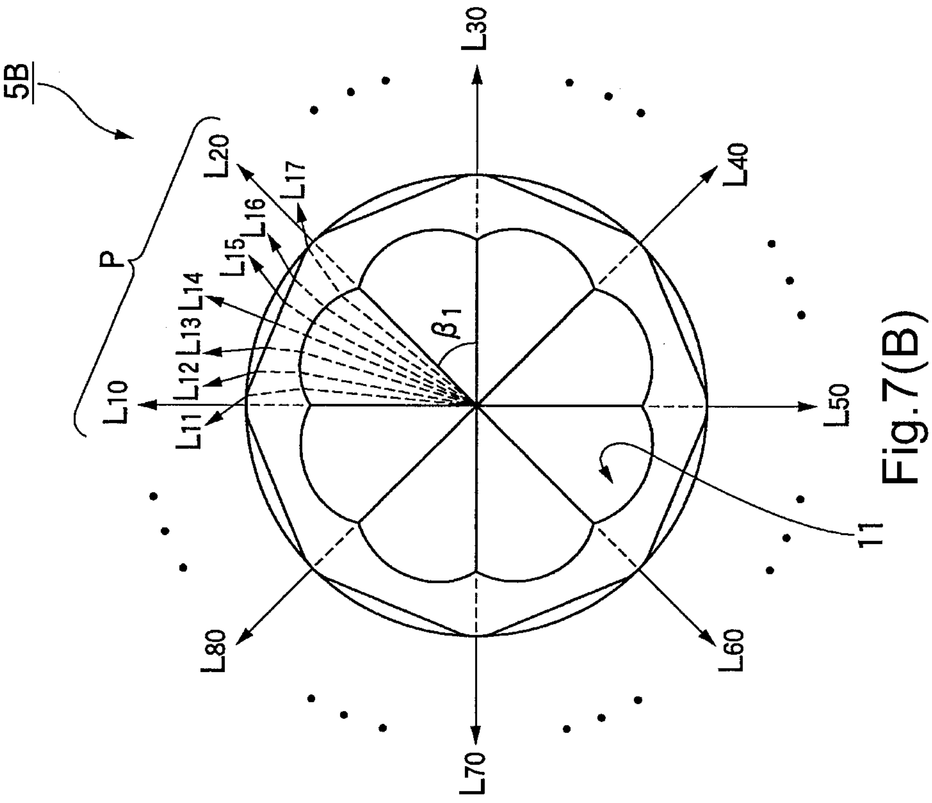
FIG. 7(B) is a diagram showing an optical path of a reflected light reflected to the rotary shaft.
Figure 7A:
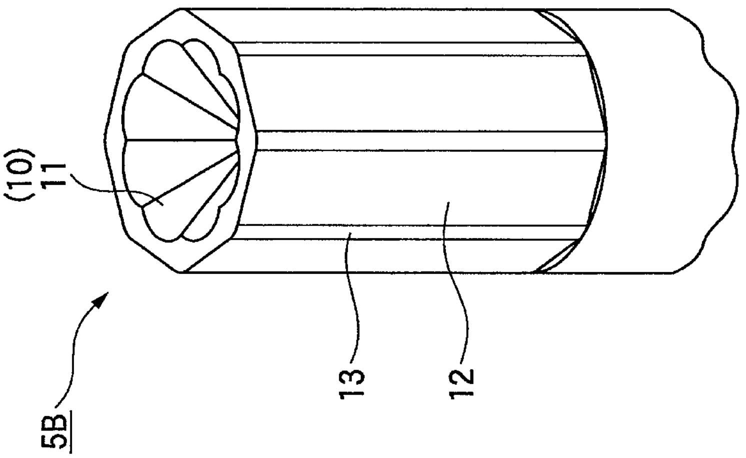
FIG. 7(A) is a perspective view showing a rotary shaft of a meter apparatus to which an illuminating structure according to a second embodiment of the present invention is applied.

FIG. 7(A) and FIG. 7(B) show an essential portion of a rotary shaft 5B of a meter apparatus to which the illuminating structure according to the second embodiment is applied. The rotary shaft 5B of this embodiment is different from the rotary shaft 5 of the first embodiment in the points that the lateral light separating unit 10 provided to the upper end surface of the upper end portion which is the front end portion of the rotary shaft 5B is configured as a reflective surface 11 having a substantially polygonal pyramid-shaped hole and that the outer surface 12 of the front end portion of the rotary shaft 5B has a polygonal pillar shape.

In addition, in order to press an indicator shaft, not shown, of this embodiment to be fitted to the outer surface 12 of the front end portion of the rotary shaft 5B from the outside, a hole, not shown, formed in the lower end surface of the lower end portion which is the front end portion of the indicator shaft also has a polygonal pillar shape with the same number of corners corresponding to the polygonal pillar shape of the outer surface 12 of the rotary shaft 5B. By doing so, the outer surface 12 of the upper end portion of the rotary shaft 5B may be tightly fitted in the hole of the lower end portion of the indicator shaft without a gap. As described above, since the outer surface 12 of the upper end portion of the rotary shaft 5B and the inner surface of the hole of the lower end surface of the indicator shaft have the polygonal pillar shape, the indicator may be easily and reliably assembled in an accurate direction.

The reflective surface 11 is configured with an eight-petal shape which represents a regular octagonal pyramid. In other words, the reflective surface 11 of this embodiment is configured so that each reflective surface has a substantially isosceles triangular shape with a central angle β1, namely a vertex angle β1, and each reflective surface 11 is curved with an arc sectional shape to have a dented concave shape. In addition, though the regular polygonal pyramid hole of the reflective surface 11 has a regular octagonal pyramid shape in this embodiment, various polygonal pyramid shapes, for example a regular dodecagonal pyramid shape, an octadecagonal pyramid shape and the like may be applied to the hole, without being limited to the above.

The outer surface 12 having a polygonal pillar shape is disposed at the same phase corresponding to the reflective surface 11 and has a polygonal pillar shape with the same number of corners of the reflective surface 11. As shown in FIG. 7(B), the illuminating light reflected on each reflective surface 11 is refracted on the outer surface 12 with the polygonal pillar shape and is then emitted as the reflected light P toward the external text panel 9 or the reflecting unit 4A. In addition, the outer surface 12 with the polygonal pillar shape according to this embodiment represents a regular octagonal pillar shape, and each outer surface is a rectangular surface. In addition, in this embodiment, a rectangular connection surface 13 with a small width is formed between the rectangular surfaces which configure the outer surfaces 12 of each prism.

Next, the operation of this embodiment will be described in comparison to the rotary shaft 5 of the first embodiment.

In the meter apparatus of this embodiment, in FIG. 7(A) and FIG. 7(B), the illuminating light emitted from the light source, not shown, repeats the propagation phenomenon where the illuminating light progresses upwards while causing total reflection at the interface between the externality and the outer surface 12 in the rotary shaft 5B. In addition, if the illuminating light reaches the upper end portion of the rotary shaft 5B, the illuminating light partially causes Fresnel reflection on each reflective surface 11 of the upper end surface which is the lateral light separating unit 10 to progress in an inclined downward direction in the rotary shaft 5B. In addition, the illuminating light becomes the reflected light P and transmits through the rotary shaft 5B and the outer circumference of the indicator shaft, not shown, and then is reflected again toward the text panel 9 by the reflecting unit 4A provided at the inner surface of the case 4 on the light-progressing optical path so that the text panel 9 may be illuminated.

In this case, the reflected light P progresses along each optical path L11 to L17 shown in FIG. 7(B) (but, only optical paths for one reflective surface 11 are shown) and is emitted from the outer surface 12 of the rotary shaft 5B, but the reflected light P is formed to have light flux having substantially uniform brightness distribution (or, illumination distribution). In other words, in FIG. 8, for example for each reflective surface 11, considering the optical paths of illuminating light from the light source which is conformally incident in a radial direction, the reflected lights P1 to P3 are emitted with substantially the same angle difference γ1=γ2.

Figure 8:
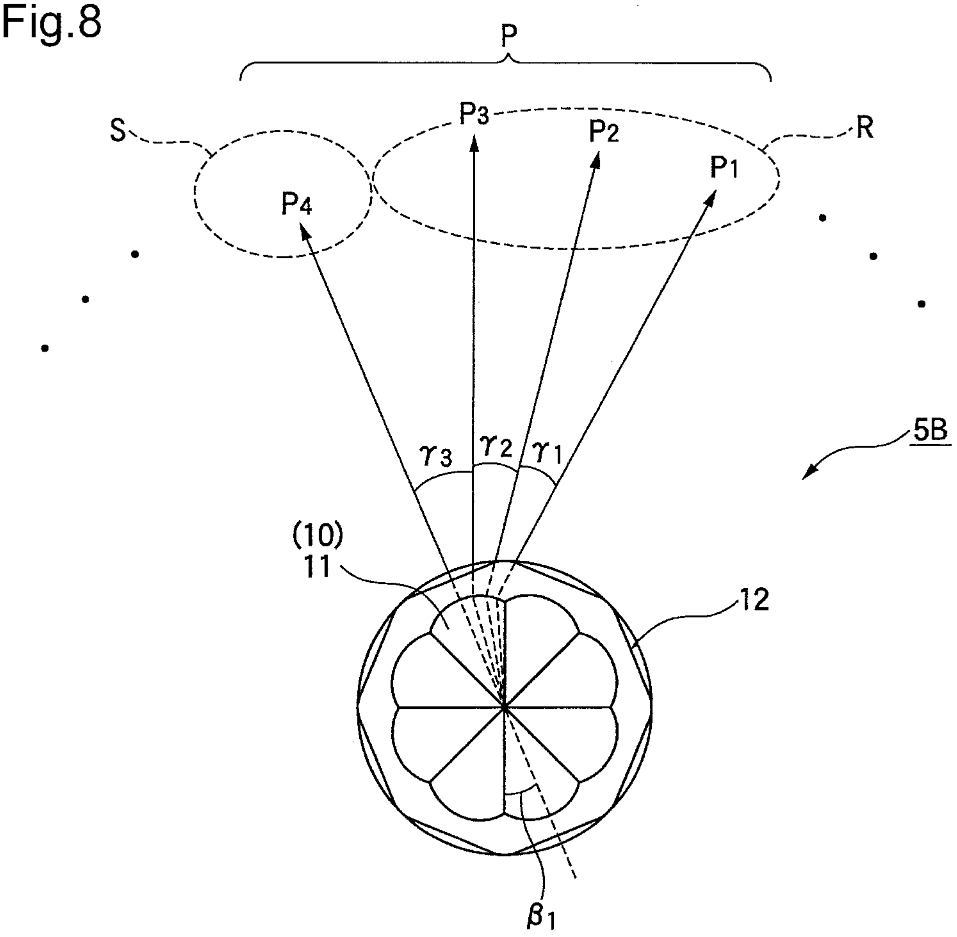
FIG. 8 is a diagram showing a distributed state of an optical path of the reflected light progressing from the rotary shaft of the meter apparatus shown in FIG. 7(A) and FIG. 7(B) to the outside.

In addition, in FIG. 8, the reflected light P4 incident on the center portion of the reflected surface 11 passes through the reflective surface 11 as it is, but in vicinity regions R of the reflected light P4, the angle difference between the optical paths of the reflected lights P1 to P4 becomes γ3≈γ1 and γ3≈γ2, so there is formed a region S with a slightly low brightness compared with the vicinity regions R in a microscopic view.

However, if simulations are performed to the meter apparatus of this embodiment, it could be found that the highlight, namely the appearance of a region having especially high brightness or remarkable brightness compared with the overall brightness, may be substantially eliminated. In other words, the increase of brightness in the vicinity regions R may be restrained in comparison to the region S. By doing so, even though the rotary shaft 5B is rotating, it is possible to avoid blinking or rotation of the blinking which is inconvenient to the eyes of an observer.

Figure 9B:
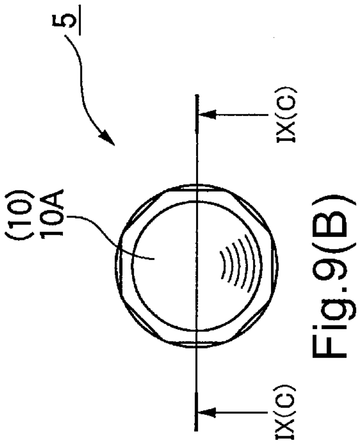
FIG. 9(A) to FIG. 9(C) are a perspective view, a plan view, and a cross-sectional view taken along the line IX(C)-IX(C) of FIG. 9(B) showing the rotary shaft of the meter apparatus according to the first embodiment, which is used for the comparison with the rotary shaft according to the second embodiment.
Figure 9C:
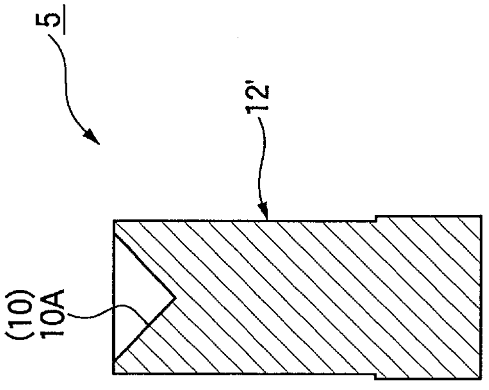
Figure 9A:
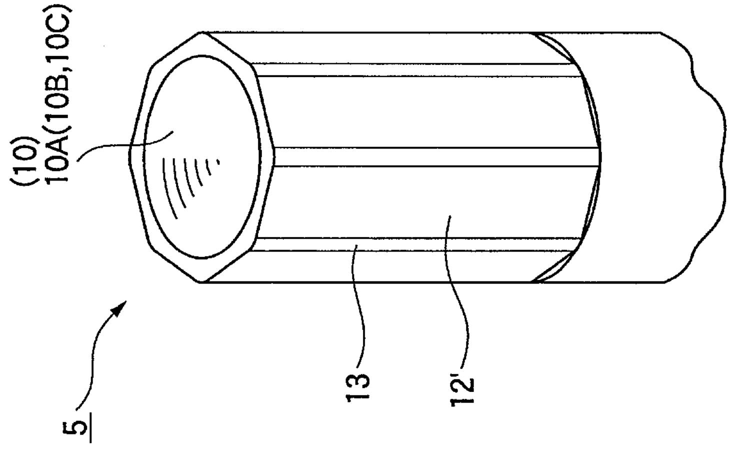

Meanwhile, in the case of the rotary shaft 5 provided to the meter apparatus according to the first embodiment as shown in FIG. 9(A) to FIG. 9(C), though the upper end surface of the rotary shaft 5 is the lateral light separating unit 10 having the hole formed with a dented substantially conical shape, if the outer surface 12' has a polygonal pillar shape, a noticeable highlight is generated.

Figure 10:
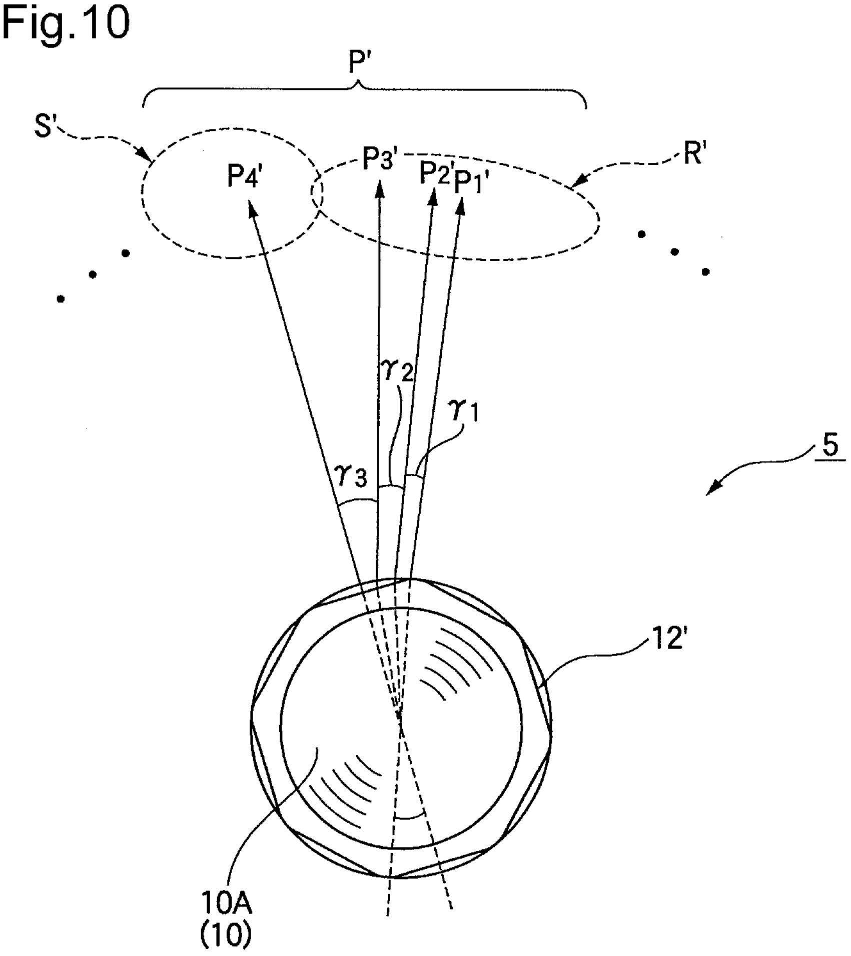
FIG. 10 is a diagram showing a distributed state of an optical path of the reflected light progressing from the rotary shaft of the first embodiment shown in FIG. 9(A) to FIG. 9(C) to the outside.

In other words, as shown in FIG. 10, the illuminating light emitted from the light source, not shown, repeats the propagation phenomenon where the illuminating light progresses upwards while causing total reflection at the interface between the externality and the outer surface 12' in the rotary shaft 5. In addition, if the illuminating light reaches the upper end portion of the rotary shaft 5, the illuminating light partially causes Fresnel reflection on the reflective surface 10A of the upper end surface which is the lateral light separating unit 10 to progress in an inclined downward direction in the rotary shaft 5. In addition, as shown in FIG. 1, the illuminating light becomes the reflected light P and transmits through the outer surface 12' of the rotary shaft 5 and the outer circumference of the indicator shaft 6 and then is reflected again by the reflecting unit 4A provided at the inner surface of the case 4 on the light-progressing optical path toward the text panel 9 so that the text panel 9 may be illuminated.

In this case, the reflected light P progresses along each optical path shown in FIG. 10 and is emitted from the outer surface 12' of the rotary shaft 5, but the reflected light P' is formed with an output distribution having many unevenness. In other words, in FIG. 10, at the interface between the externality and the outer surface 12' of the rotary shaft 5, each illuminating light conformally incident in a radial direction from the light source is emitted with various angle differences γ1, γ2, γ3 and γ4 in regard to the reflected lights P1' to P4' when being refracted by the outer surface 12' and then emitting. In particular, the angle difference γ3 between the reflected lights P3 and P4 is greater than the angle difference between the reflected lights P1' to P3'. For this reason, regarding the reflected lights P1' to P4', since the vicinity region R' and the region S' are greatly different in brightness, the vicinity region R appears. As a result, if the rotary shaft 5 rotates, blinking or rotation of the blinking which is inconvenient to the eyes of an observer is remarkably generated.

Further, in the embodiment shown in FIG. 7(A) and FIG. 7(B), each reflective surface 11 having the hole with a dented polygonal shape, which is the lateral light separating unit 10 provided to the upper end surface of the front end portion of the rotary shaft 5C, has an arc shape and a dented curved shape but is not limited thereto. In other words, for example, as shown in FIG. 11(A) and FIG. 11(B), each reflective surface 14 of the hole formed with a regular octagonal pyramid shape which is the lateral light separating unit 10 may be configured as a flat surface.

Figure 11B:
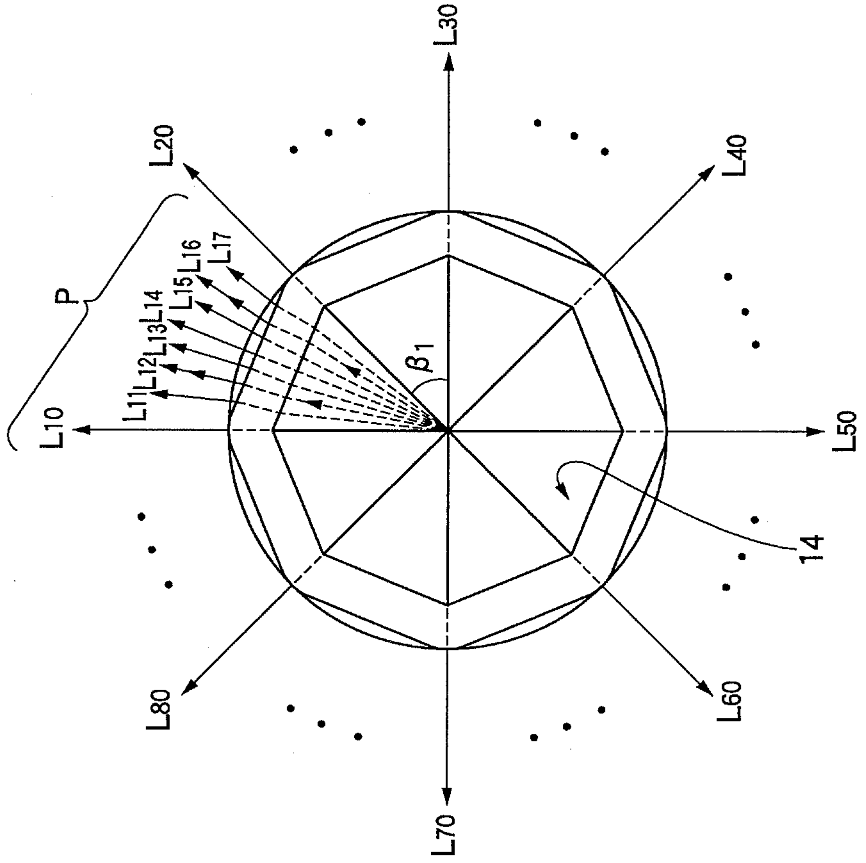
FIG. 11(B) is a diagram showing an optical path of the reflected light reflected to the rotary shaft.
Figure 11A:
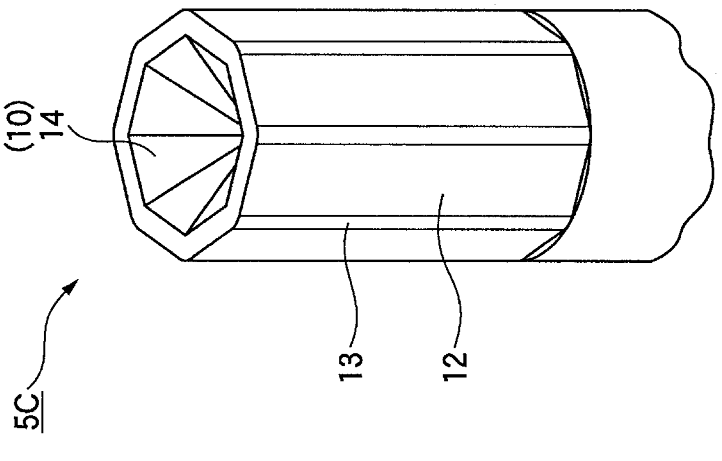
FIG. 11(A) is a perspective view showing a modified example of the rotary shaft according to the second embodiment shown in FIG. 7(A) and FIG. 7(B)

Even in this case, as shown in FIG. 11(B), the reflected light P progressing along each optical path L10 to L17 may realize substantially uniform brightness distribution, substantially identical to the case of the second embodiment, and therefore the generation of highlights may be restrained. As a result, when the rotary shaft 5C rotates, it is possible to avoid blinking or rotation of the blinking which is inconvenient to the eyes of an observer.

Figure 12B:
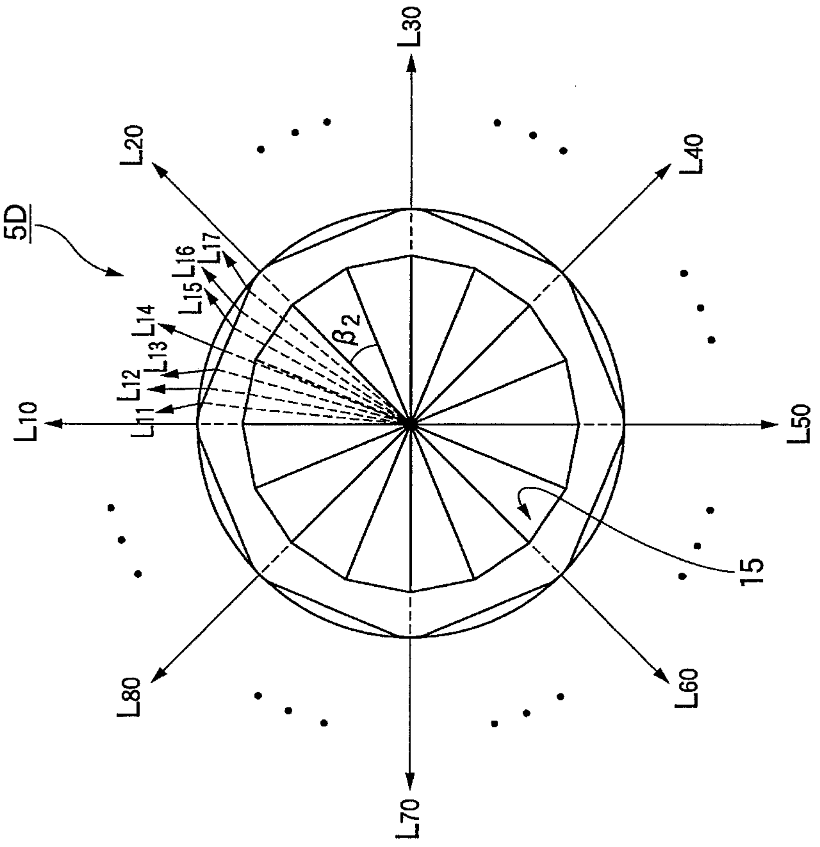
FIG. 12(B) is a diagram showing an optical path of the reflected light reflected to the rotary shaft.
Figure 12A:
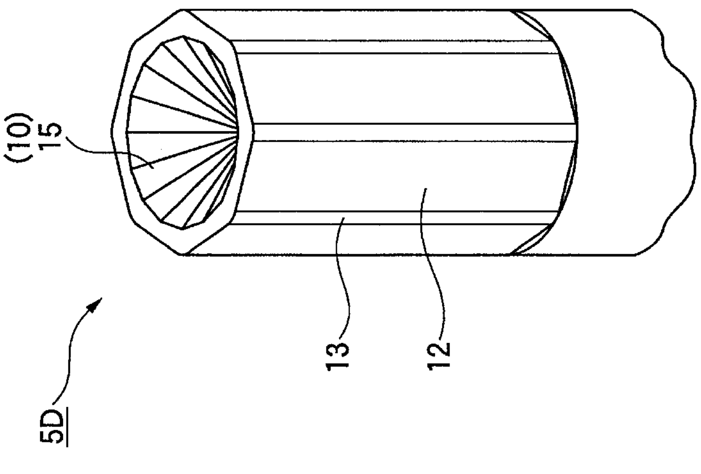
FIG. 12(A) is a perspective view showing another modified example of the rotary shaft according to the second embodiment shown in FIG. 7(A) and FIG. 7(B)

In addition, for example, as shown in FIG. 12(A) and FIG. 12(B), each reflective surface 15 having a hole formed with a regular hexadecagonal pyramid shape and configured as an isosceles triangle with a central angle β2, which is the lateral light separating unit 10, may be configured on a flat surface. Even in this case, substantially uniform brightness distribution may be realized, substantially identical to the case of the second embodiment, and therefore the generation of highlights may be restrained. By doing so, when the rotary shaft 5D rotates, it is possible to avoid blinking or rotation of the blinking which is inconvenient to the eyes of an observer.

Third Embodiment

Figure 13:
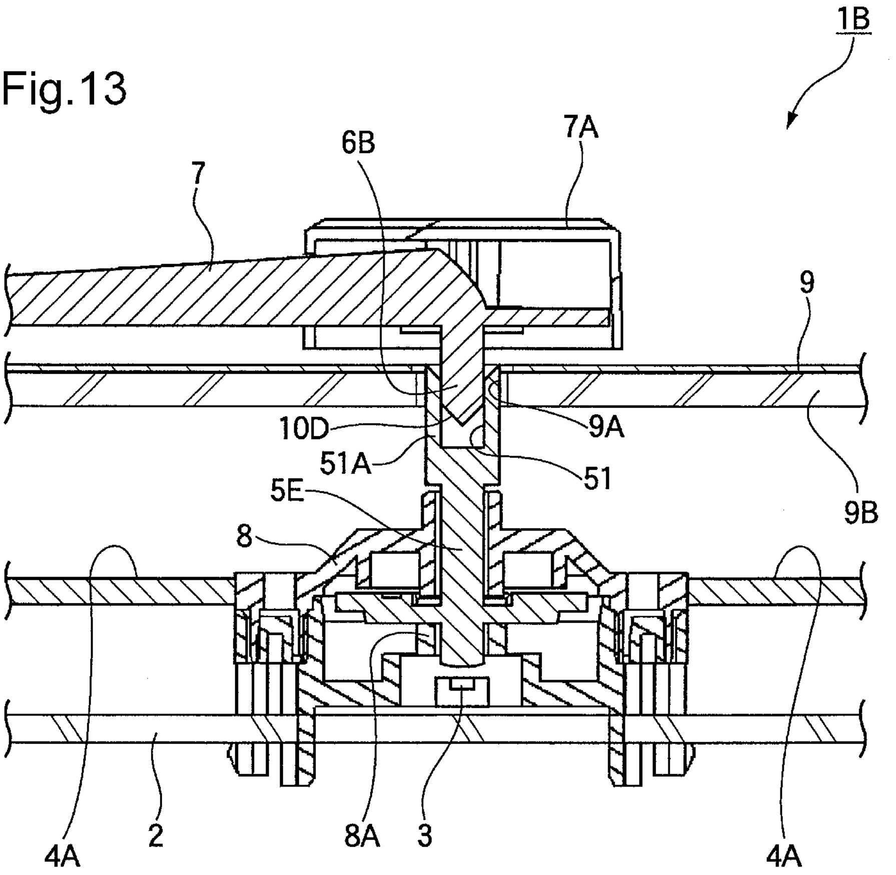
FIG. 13 is a cross-sectional view showing an essential part of a meter apparatus to which an illuminating structure of a meter apparatus according to a third embodiment of the present invention is applied.

Next, a third embodiment of the present invention will be described with reference to FIGS. 13, 14(A) and 14(B). In addition, in this embodiment, the same component as in the first embodiment is represented by the same reference symbol to avoid duplicated description.

The meter apparatus 1B of this embodiment to which the illuminating structure of the present invention is applied is different from the meter apparatus 1 of the first embodiment in the points that a hole 51 through which the front end portion of the indicator shaft 6B is inserted is formed in the rotary shaft 5E, that the indicator shaft 6B is mounted to the rotary shaft 5E as being inserted through the hole 51, and that the lateral light separating unit 10D is formed to protrude on the front end portion of the indicator shaft 6B toward the light source 3.

Figure 14A:
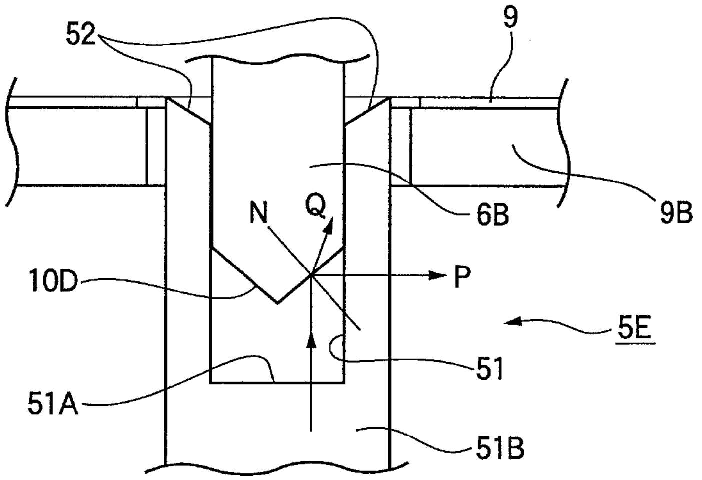
FIG. 14(A) and FIG. 14(B) are enlarged cross-sectional views showing an essential portion of the meter apparatus to which the illuminating structure of a meter apparatus according to the third embodiment of the present invention is applied, where
Figure 14B:
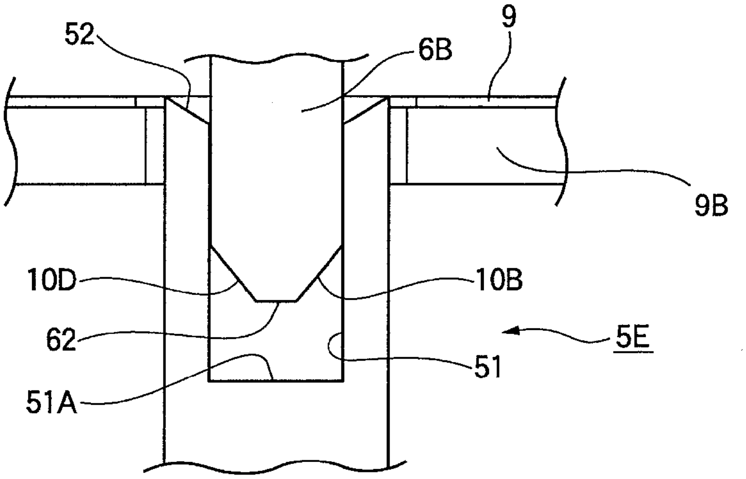

In addition, in this embodiment, the upper end surface 52 close to the outer circumference of the rotary shaft 5E shown in FIG. 14(A) and FIG. 14(B) is formed with a conical shape, or a bowl shape, and inclined to be dented toward the center side so that the lateral light separating unit 10D is further added, thereby separating the illuminating light toward the text panel 9 though it is small.

In addition, the protrusive portion of the lower end surface of the indicator shaft 6B having a substantially mountain-like shape, which is the lateral light separating unit 10D, concretely has the same outline as shown in FIG. 6(A) to FIG. 6(D) of the first embodiment (though they are different in protrusive and dented shapes). In other words, the lower end surface located at the front end portion of the indicator shaft 6B may have a substantially triangular sectional shape, a substantially U-shaped sectional shape, a shape where a straight line continuously extends along the axial line L in the cross-sectional view, or a substantially trapezoidal sectional shape. In addition, regarding the tilt angle of the lower end surface of the indicator shaft 6B which is the lateral light separating unit 10D, for example, it may be configured to have the same angle as shown in FIG. 4(A) to FIG. 4(C), similar to the case of the first embodiment.

Next, the operation and effects of this embodiment will be described.

In this embodiment, the illuminating light from the light source 3, which passes while being refracted by a floor surface 51A of the hole 51 formed in the upper end surface which is the front end surface of the rotary shaft 5E is partially reflected on the lower end surface of the indicator shaft 6B with a substantially mountain-like shape, which is the lateral light separating unit 10D, as shown in FIG. 14(A), so that the reflected light P is directly incident on the text panel 9. Or else, though the reflected light P is not directly incident, the reflected light P may be reflected again toward the text panel 9 by the reflecting unit 4A provided to the inner surface of the case 4 on the optical path along which the reflected light P progresses, so that the text panel 9 may be illuminated.

Therefore, even in this embodiment, the indicator 7 and the text panel 9 may be illuminated by partially separating the illuminating light incident on the indicator 7 toward the text panel 9 by the lateral light separating unit 10D, as in the first embodiment.

In addition, in this embodiment, in the case where, among the illuminating light from the light source 3, the illuminating light oriented toward the indicator 7 has a slightly excessive intensity, the intensity ratio of the illuminating light biased in a lateral side may be partially reduced not by forming an inclined surface as the lateral light separating unit 10D over the entire lower end surface of the indicator shaft 6B but, for example, by forming the vicinity of the center portion as a flat surface as shown in FIG. 14(B).

Figure 15:
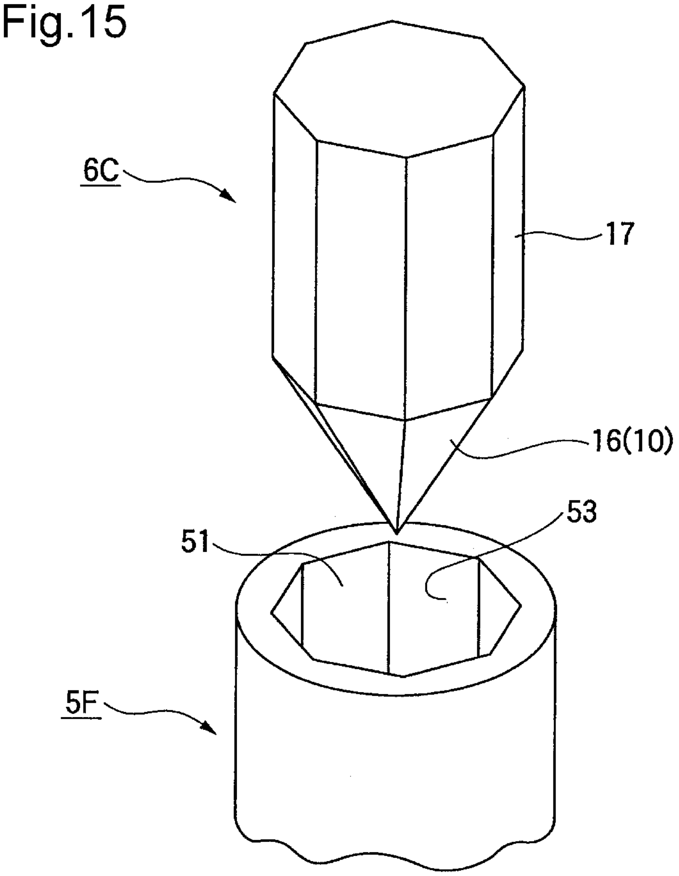
FIG. 15 is an exploded perspective view showing essential portions of a rotary shaft and an indicator shaft used in a modified example of the meter apparatus to which the illuminating structure of a meter apparatus according to the third embodiment of the present invention as shown in FIG. 13 is applied.
Figure 16:
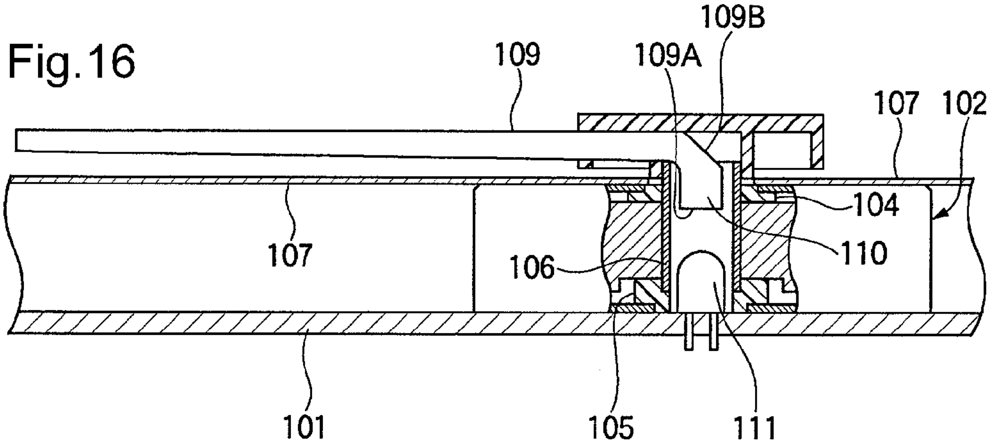
FIG. 16 is a cross-sectional view showing an essential portion of a meter apparatus to which a conventional illuminating structure of a meter apparatus is applied.
Figure 17:
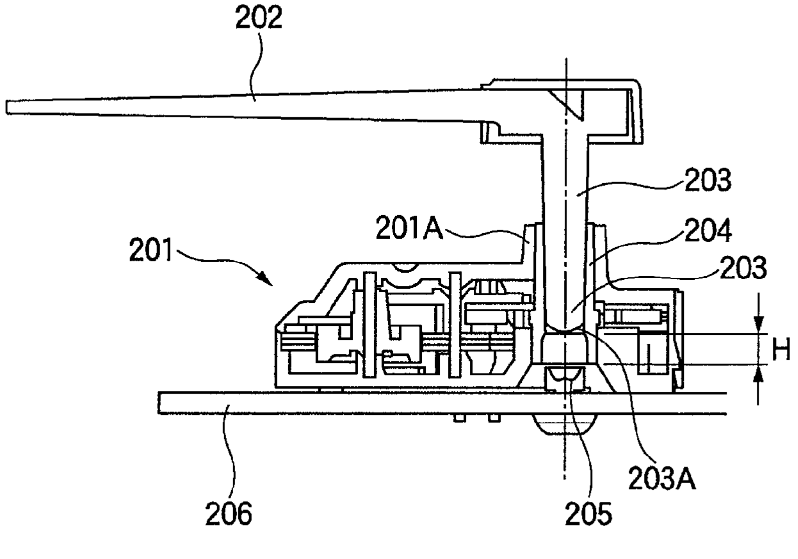
FIG. 17 is a cross-sectional view showing an essential portion of a meter apparatus to which another conventional illuminating structure of a meter apparatus is applied.

In addition, in the meter apparatus 1B according to this embodiment, as shown in FIG. 15, the rotary shaft 5F and the indicator shaft 6C may be configured as follows.

In other words, the lateral light separating unit 10 provided to the lower end surface of the lower end portion of the indicator shaft 6C is configured as the reflective surface 16 having a convex portion with a protrusive substantially regular polygonal pyramid shape, and the outer surface 17 of the lower end portion of the indicator shaft 6C is configured with a regular polygonal pillar shape with the same number of corners as the reflective surface 16.

For example, it is preferred that the reflective surface 16 of the lateral light separating unit 10 is formed with a regular octagonal pyramid shape, each reflective surface of the octagonal pyramid shape is an isosceles triangular shape, and each reflective surface is formed as a protrusive curved surface which billows with an arc sectional shape. In addition, the outer surface 17 of the indicator shaft 6C has a regular octagonal pillar shape, and each surface has a rectangular shape.

Meanwhile, regarding the rotary shaft 5F which fits the front end portion of the indicator shaft 6C in an inserted state, the hole 51 formed in the upper end surface of the upper end portion of the rotary shaft 5F is configured with the same dented regular polygonal pillar shape having the same number of corners corresponding to the outer surface 17 of the indicator shaft 6C.

In other words, regarding the rotary shaft 5F, in order to fit the outer surface 17 of the lower end portion of the indicator shaft 6C in an inserted state, the hole 51 of the upper end surface has a dented regular octagonal pillar shape which is identical to the shape of the outer surface 17 of the indicator shaft 6C. In addition, the inner surface 53 of the hole 51 is formed to have a rectangular shape identical to the outer surface 17 of the indicator shaft 6C.

Furthermore, in addition to the indicator shaft 6C as configured above, for example regarding the reflective surface having a convex portion with a substantially polygonal pyramid shape which is the lateral light separating unit provided to the lower end surface of the indicator shaft, each reflective surface may have not a protrusive curved surface where the reflective surface billows in an arc sectional shape but an isosceles triangular shape with a flat form. In addition, the convex portion with the substantially polygonal pyramid shape which is the lateral light separating unit of the indicator shaft may protrude with a regular hexadecagonal pyramid shape, not an octagonal pyramid shape.

In addition, the present invention is not limited to the above embodiments but may be implemented in various ways within the scope not departing from the spirit. In other words, the present invention may be applied to various kinds of meter apparatus, such as a fuel gauge, a tachometer, a speedometer, a marine thermometer and the like.

According to the illuminating structure of the meter apparatus according to the present invention, since the optical path of the illuminating light is partially separated toward the text panel by the lateral light separating unit, the text panel is illuminated by using the partial light incident to the indicator, and therefore the indicator and the text panel can be illuminated simultaneously by using one light source, which reduces costs.

What is claimed is:

1. An illuminating structure of a meter apparatus, comprising:

a text panel;

a rotary shaft rotating by a rotating force transferred from a motor and installed to a rear side of the text panel;

an indicator having a hole through which a front end portion of the rotary shaft is inserted, the indicator rotating along a surface of the text panel having an indicator shaft mounted to the rotary shaft as the front end portion of the rotary shaft is inserted through the hole; and a light source for emitting illuminating light to a base end portion of the rotary shaft, wherein the indicator rotates to indicate various kinds of information, wherein the rotary shaft has a lateral light separating unit, formed by a dented portion toward the light source, at a front end surface of the front end portion thereof, and wherein the lateral light separating unit partially separates the illuminating light incident on the indicator toward the text panel.

2. The illuminating structure of a meter apparatus according to claim 1, wherein the lateral light separating unit provided to the front end surface of the front end portion of the rotary shaft is configured as a reflective surface having a hole with a substantially conical shape.

3. The illuminating structure of a meter apparatus according to claim 1, wherein the lateral light separating unit provided to the front end surface of the front end portion of the rotary shaft is configured as a reflective surface having a hole with a regular polygonal pyramid shape, and wherein the outer surface of the front end portion of the rotary shaft is configured as a surface with a regular polygonal pillar shape with the same number of corners corresponding to the reflective surface provided to the hole of the front end surface.

4. The illuminating structure of a meter apparatus according to claim 3, wherein each reflective surface configuring each polygonal pyramid surface has a curved shape dented with an arc sectional shape.

5. An illuminating structure of a meter apparatus, comprising:

a text panel;

an indicator having an indicator shaft and rotating along a surface of the text panel;

a rotary shaft having a hole through which a front end portion of the indicator shaft is inserted, the indicator shaft being mounted to the rotary shaft as the front end portion is inserted through the hole, the rotary shaft rotating by a rotating force transferred from a motor and provided to a rear surface of the text panel; and a light source for emitting illuminating light to a base end portion of the rotary shaft, wherein the indicator rotates to indicate various kinds of information, wherein the indicator shaft has a lateral light separating unit formed to protrude on the front end portion thereof toward the light source, and wherein the lateral light separating unit partially separates the illuminating light incident on the indicator toward the text panel.

6. The illuminating structure of a meter apparatus according to claim 5, wherein the lateral light separating unit provided to the front end surface of the front end portion of the indicator shaft is configured as a reflective surface having a convex portion with a protrusive conical shape.

7. The illuminating structure of a meter apparatus according to claim 5, wherein the lateral light separating unit provided to the front end surface of the front end portion of the indicator shaft is configured as a reflective surface having a convex portion with a protrusive regular polygonal pyramid shape, and the outer surface of the front end portion of the indicator shaft is configured as a surface with a regular polygonal pillar shape having the same number of corners corresponding to the reflective surface, and wherein the hole of the front end portion of the rotary shaft in which the outer surface of the front end portion of the indicator shaft is fitted in an inserted state is configured as a surface with a polygonal pillar shape with the same number of corners corresponding to the outer surface with a polygonal pillar shape provided to the front end portion of the indicator shaft.

8. The illuminating structure of a meter apparatus according to claim 7, wherein each reflective surface with the polygonal pyramid shape has a protrusive curved surface shape where the reflective surface billows with an arc sectional shape.

9. The illuminating structure of a meter apparatus according to claim 1, further comprising a case having a reflecting unit formed at an inner surface of the mounted text panel which is opposite to the rear surface of the text panel, wherein the illuminating light separated by the lateral light separating unit is reflected on the reflecting unit and then is incident to the text panel.

* * * * *